Sept. 28, 1926.

F. P. DIERKES 1,601,683

AUTOMATIC BEARING TAKE-UP

Filed May 21, 1924

F. P. Dierkes  INVENTOR

BY Victor J. Evans

ATTORNEY

WITNESSES

Patented Sept. 28, 1926.

1,601,683

UNITED STATES PATENT OFFICE.

FRANK P. DIERKES, OF WILKES-BARRE, PENNSYLVANIA.

AUTOMATIC BEARING TAKE-UP.

Application filed May 21, 1924. Serial No. 714,967.

This invention relates to improvements in bearings the general object of the invention being to provide means for automatically taking up wear between the parts of the bearing and the shaft so that it is unnecessary to remove shims and the like in order to readjust the parts.

Another object of the invention is to provide spring means for taking up the wear with means for protecting the spring means against injury due to relative movement of the parts.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
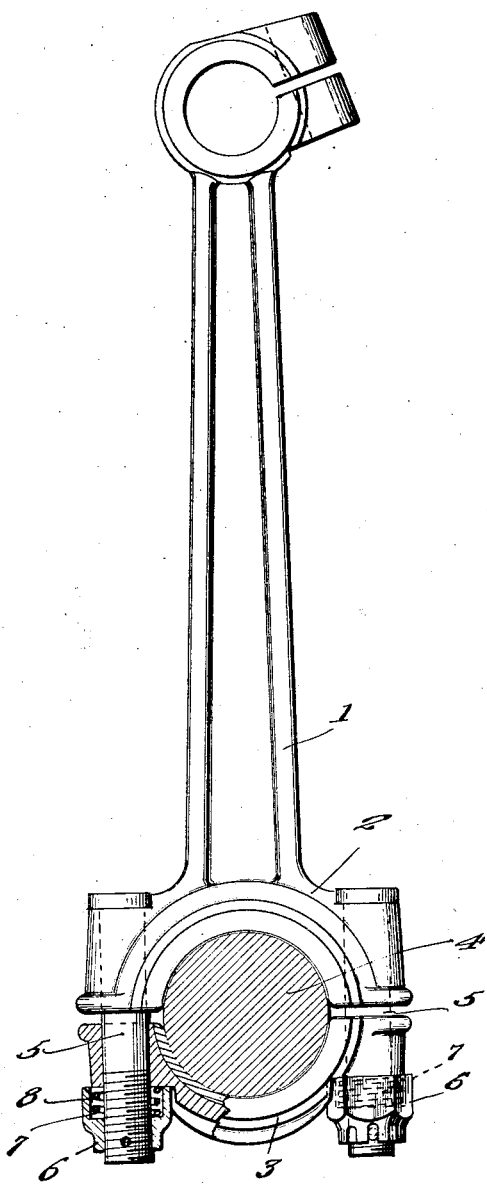
Figure 1 is a view partly in section showing the application of the invention to a connecting rod bearing.
Figure 2:
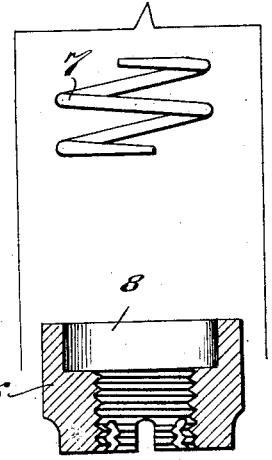
Figure 2 is an enlarged sectional view of one of the nuts and its spring.

In these views, 1 indicates the connecting rod which is formed with the semi-circular bearing part 2 and 3 indicates the bearing cap which cooperates with the part 2 to connect the rod with the shaft 4. The cap is connected with the part 2 by the bolts 5 and the nuts 6. Shims are placed between the parts 2 and 3 in order to separate the parts a sufficient distance to make a snug fit on the shaft. When the parts become worn and play develops it is necessary to remove some of these shims and then screw up the nuts to take up the play. This requires considerable labor and time, due to the inaccessibility of the parts and in order to take up this play automatically I provide springs 7 on the bolts between the cap and the nuts and which act to press the cap against the shaft. In order to protect these springs from backlash and damage by other blows I form recesses 8 in the nuts 6 to receive the springs so that when the nuts are screwed home on the bolts the springs will be enclosed by the walls of the recesses and thus be protected from injury. The springs are free to exert pressure between the nuts and the cap so as to keep the cap pressed against the shaft and thus automatically prevent play between the parts.

While the drawings show the invention in connection with a connecting rod it will of course be understood that the invention can be used on other types of bearings.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An automatic take-up for connecting rods comprising a bearing part and its cap, bolts passing through said part and slidably receiving the cap for connecting the latter with the part about a crank shaft, nuts threaded on the bolts and being provided with recesses therein, springs surrounding the bolts and arranged in said recesses with their ends engaging the cap and the bottom of the recesses respectively, said springs applying pressure to cushion the cap for a give and take action with respect to the crank shaft and to take-up wear between the crank shaft and bearing, said recesses providing housings for the springs to protect the latter, and cotter pins for securing the nuts in a fixed position on said bolts.

In testimony whereof I affix my signature.

FRANK P. DIERKES.